(12) United States Patent
Haari et al.

(10) Patent No.: US 9,366,430 B2
(45) Date of Patent: Jun. 14, 2016

(54) FLARE SYSTEM AND METHOD FOR REDUCING DUST THEREFROM

(71) Applicant: MITSUBISHI HEAVY INDUSTRIES, LTD., Tokyo (JP)

(72) Inventors: Kenta Haari, Tokyo (JP); Osamu Shinada, Tokyo (JP); Yasunari Shibata, Tokyo (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 410 days.

(21) Appl. No.: 13/758,063

(22) Filed: Feb. 4, 2013

(65) Prior Publication Data

US 2013/0213230 A1    Aug. 22, 2013

(30) Foreign Application Priority Data

Feb. 10, 2012 (JP) ................. 2012-027418

(51) Int. Cl.
*F23G 7/08* (2006.01)
*B01D 47/06* (2006.01)

(52) U.S. Cl.
CPC . *F23G 7/08* (2013.01); *B01D 47/06* (2013.01)

(58) Field of Classification Search
CPC ........ B01D 45/02; B01D 47/02; B01D 47/00; B01D 47/06; B01D 47/12; B01D 47/024; B01D 2247/00; B01D 2247/04; B01D 2247/10; B01D 2247/106; B01D 2247/107; B01D 50/004; B01D 2253/103; F23G 7/08
USPC ........... 95/149, 187, 195, 197, 199, 200, 202, 95/205, 223, 224; 431/346, 5
See application file for complete search history.

(56) References Cited

U.S. PATENT DOCUMENTS 1,999,589 A * 4/1935 Frey ................................ 96/273
4,141,701 A * 2/1979 Ewan ..................... B01D 47/10
    261/116

(Continued)

FOREIGN PATENT DOCUMENTS

EP    1 201 290    5/2002
JP    60-30405     5/1981

(Continued)

OTHER PUBLICATIONS

Japanese Office Action issued May 12, 2015, in Japanese Application No. 2012-027418 (with English translation).

(Continued)

*Primary Examiner* — Duane Smith
*Assistant Examiner* — Cabrena Holecek
(74) *Attorney, Agent, or Firm* — Wenderoth, Lind & Ponack, L.L.P.

(57) ABSTRACT

A ground flare system that can enhance the removal rate of dust and other such impurities contained in exhaust gas to be processed. The ground flare system that performs an incineration process on processing target gas and emits the processed gas to the atmosphere includes: a ground flare that combusts the processing target gas; a knock-out drum that is placed upstream of the ground flare and reduces a flow velocity of the processing target gas introduced thereto; a seal drum for backfire prevention placed upstream of the ground flare; a gas introducing pipe that introduces the processing target gas into the knock-out drum and/or the seal drum; and a water film forming unit that is provided inside of the gas introducing pipe and forms a water film of spray water in a direction that intersects with a flow direction of the processing target gas.

10 Claims, 2 Drawing Sheets

(56) References Cited

U.S. PATENT DOCUMENTS

| | | | | |
|---|---|---|---|---|
| 4,373,942 A | * | 2/1983 | Wright | 62/618 |
| 5,741,340 A | * | 4/1998 | Klemmer | 96/356 |
| 2005/0132883 A1 | | 6/2005 | Su et al. | |
| 2013/0336861 A1 | * | 12/2013 | Bollaert et al. | 423/210 |

FOREIGN PATENT DOCUMENTS

| JP | 57-115630 | 7/1982 |
|---|---|---|
| JP | 59-129327 | 7/1984 |
| JP | 62-108466 | 5/1987 |
| JP | 2005-500501 | 1/2005 |
| JP | 2010-142739 | 7/2010 |
| JP | 2010-235915 | 10/2010 |
| WO | 01/05489 | 1/2001 |

OTHER PUBLICATIONS

A Decision of Patent Grant issued Dec. 8, 2015 in corresponding Japanese patent application No. 2012-027418 (with English translation).

* cited by examiner

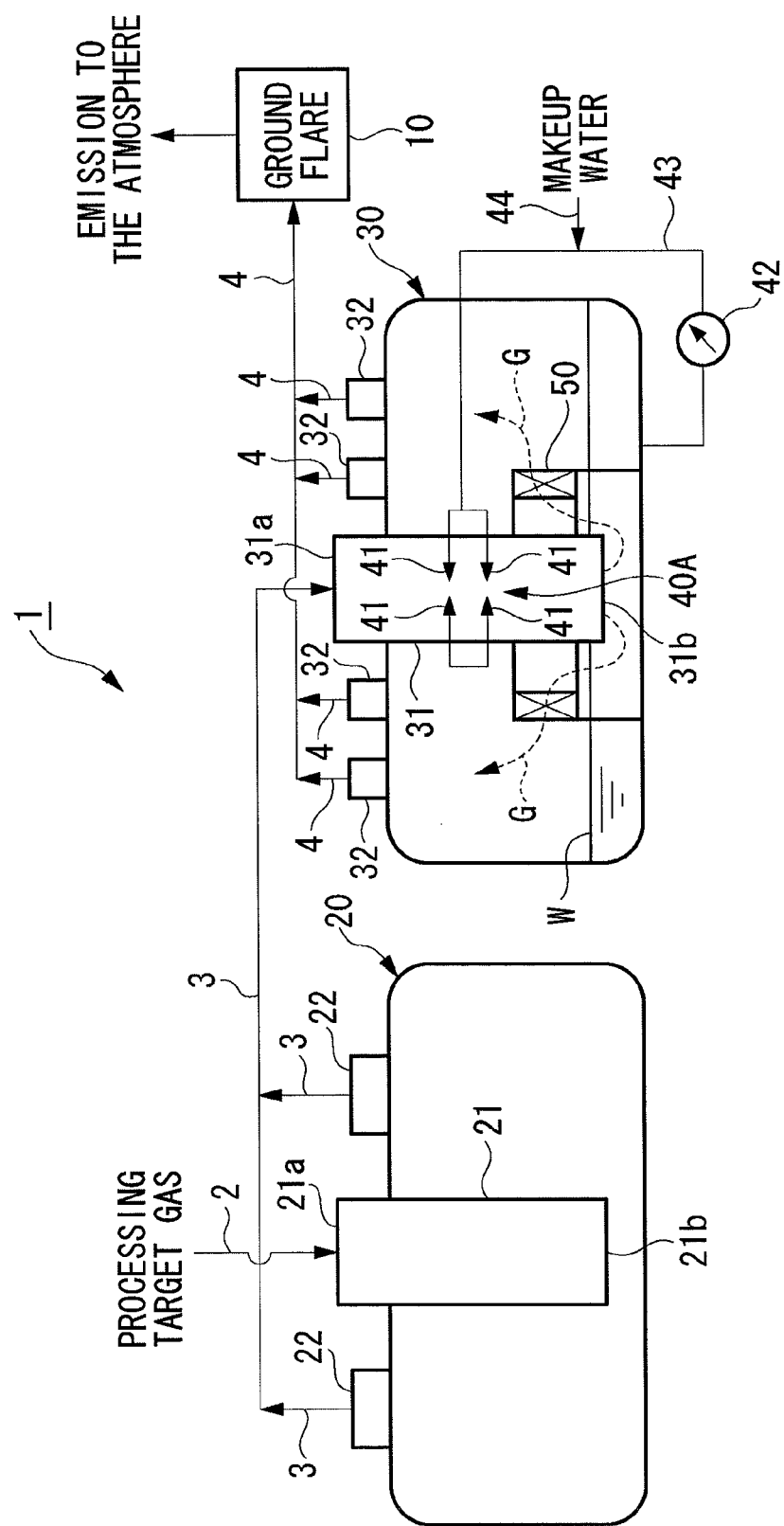

FLARE SYSTEM AND METHOD FOR REDUCING DUST THEREFROM

BACKGROUND OF THE INVENTION

1. Technical Field

The present invention relates to a flare system applied to various plants such as equipment for an integrated coal gasification combined cycle and a method for reducing dust from the flare system, and more particularly, to a technique of suppressing dust that is discharged from a flare system to the atmosphere.

2. Description of the Related Art

Up to now, in various plants for petroleum refining, iron manufacturing, coal gasification, and the like, a flare system is generally installed to perform an incineration process on exhaust gas such as generated flammable gas. In the case where dust is contained in the exhaust gas introduced to the flare system, the dust and other such impurities are unfavorably emitted from the flare system to the atmosphere. Hence, it is important to suppress the dust from the perspective of environmental pollution control.

A ground flare system is an example of such flare systems as described above. In the ground flare system, exhaust gas to be processed is combusted in a cylindrical ground flare (incineration unit) installed on the ground. In recent years, the ground flare system has been increasingly adopted because harmful influences (for example, night-time illumination and loud noise) on the environment surrounding the ground flare system are small.

In a ground flare system disclosed in Japanese Examined Patent Application Publication No. Sho 60-30405, a seal drum for backfire prevention is provided to a processing target gas introducing pipe placed upstream of a ground flare, and a water seal device including a drum filled with water is provided to a bypass line branched from a processing target gas introducing pipe placed downstream of the seal drum.

SUMMARY OF THE INVENTION

1. Technical Problem

In a conventional ground flare system, a knock-out drum that reduces the flow velocity of exhaust gas to be processed and a seal drum for backfire prevention are provided upstream of a ground flare that performs an incineration process on the exhaust gas. Unfortunately, even if dust and other such impurities are contained in the exhaust gas that passes and flows through the knock-out drum and the seal drum, the dust and other such impurities may not be sufficiently removed in some cases. Hence, for flare systems such as a ground flare system, particularly, for flare systems such as a ground flare system that processes exhaust gas discharged from a hydrocarbon fuel and the like, it is desired to further enhance the removal rate of dust contained in the exhaust gas to be processed.

The present invention, which has been made in order to solve the above-mentioned problem, has an object to provide a flare system that can enhance the removal rate of dust and other such impurities contained in exhaust gas to be processed and a dust reducing method for the flare system.

2. Solution to the Problem

The present invention adopts the following solutions in order to solve the above-mentioned problem.

A first aspect of the present invention provides a flare system that performs an incineration process on processing target gas and emits the processed gas to the atmosphere. The flare system includes: an incineration unit that combusts the processing target gas; a knock-out drum that is placed upstream of the incineration unit and reduces a flow velocity of the processing target gas introduced thereto; a seal drum for backfire prevention placed upstream of the incineration unit; a gas introducing pipe that introduces the processing target gas into the knock-out drum and/or the seal drum; and a water film forming unit that is provided inside of the gas introducing pipe and forms a water film of spray water in a direction that intersects with a flow direction of the processing target gas.

As described above, the flare system includes: the incineration unit that combusts the processing target gas; the knock-out drum that is placed upstream of the incineration unit and reduces the flow velocity of the processing target gas introduced thereto; the seal drum for backfire prevention placed upstream of the incineration unit; the gas introducing pipe that introduces the processing target gas into the knock-out drum and/or the seal drum; and the water film forming unit that is provided inside of the gas introducing pipe and forms the water film of the spray water in the direction that intersects with the flow direction of the processing target gas. Accordingly, the apparent specific gravity of dust contained in the processing target gas is increased while a flow of the processing target gas passes through the water film, so that a fall of the dust under its own weight can be promoted. As a result, the dust contained in the processing target gas is separated from the flow of the processing target gas.

In the above-mentioned flare system, the water film forming unit may form the water film at a plurality of stages in the flow direction of the processing target gas, and a particle size of the spray water may be set to be gradually larger from an upstream side to a downstream side. With this configuration, the particle size of the spray water is set to be smaller on the upstream (upper stage) side, whereby the contact area with dust particles having a small particle size is mainly increased, thus achieving an increase in apparent specific gravity. Then, the particle size of the spray water is set to be larger on the downstream (lower stage) side than that at the upper stage, whereby the apparent specific gravity of dust particles having a large particle size can also be increased. In this case, the reason for such an increase in the apparent specific gravity of the dust is that the spray water is attached to the dust and surrounds the same. Accordingly, it is desirable that the particle size of the spray water be set to be larger than the particle size of the dust to be processed.

The above-mentioned flare system may further include, inside of the knock-out drum and/or the seal drum, a mist separator through which the processing target gas that has passed through the water film forming unit passes. With this configuration, mist that tries to flow out of the knock-out drum and/or the seal drum together with the processing target gas can be removed.

In the above-mentioned flare system, the water film forming unit may include: a water film forming nozzle that jets the spray water; a circulation pump that supplies the spray water to the water film forming nozzle; and a spray water flow channel that connects the water film forming nozzle to the circulation pump and circulates the spray water therebetween. With this configuration, the spray water can be repetitively used. Note that it is desirable to provide, as needed, a water supply line that makes up for a portion of the spray water reduced by evaporation and the like.

A second aspect of the present invention provides a method for reducing dust from a flare system that performs an incineration process on processing target gas and emits the processed gas to an atmosphere, the flare system including: an incineration unit that combusts the processing target gas; a knock-out drum that is placed upstream of the incineration unit and reduces a flow velocity of the processing target gas introduced thereto; a seal drum for backfire prevention placed upstream of the incineration unit; and a gas introducing pipe that introduces the processing target gas into the knock-out drum and/or the seal drum, the method including: forming a water film of spray water inside of the gas introducing pipe; and causing the processing target gas to pass through the water film.

As described above, the method for reducing dust from a flare system includes: forming the water film of the spray water inside of the gas introducing pipe that introduces the processing target gas into the knock-out drum and/or the seal drum; and causing the processing target gas to pass through the water film. Accordingly, the apparent specific gravity of dust contained in the processing target gas that has passed through the water film is increased by attachment of the spray water, so that a fall of the dust under its own weight is promoted. As a result, the dust contained in the processing target gas is separated from a flow of the processing target gas.

The above-mentioned method for reducing dust from a flare system may further include forming the water film at a plurality of stages in a flow direction of the processing target gas such that a particle size of the spray water is gradually larger from an upstream side to a downstream side of a flow of the processing target gas inside of the gas introducing pipe.

Moreover, the above-mentioned method for reducing dust from a flare system may further include causing the processing target gas that has passed through the water film to pass through a mist separator provided inside of the knock-out drum and/or the seal drum.

Moreover, the above-mentioned method for reducing dust from a flare system may further include: connecting a water film forming nozzle that jets the spray water, to a circulation pump that supplies the spray water to the water film forming nozzle; and circulating the spray water between the water film forming nozzle and the circulation pump.

3. Advantageous Effects of the Invention

According to the present invention described above, the water film of the spray water is formed inside of the gas introducing pipe that introduces the processing target gas into the knock-out drum and/or the seal drum, and the processing target gas is caused to pass and flow through the water film. Accordingly, the apparent specific gravity of the dust contained in the processing target gas is increased, so that falling of the dust under its own weight is promoted. Hence, the dust contained in the processing target gas can be efficiently separated from the flow of the processing target gas, and the removal rate of the dust contained in the processing target gas can be further enhanced.

As a result, even if dust is contained in the exhaust gas introduced to the flare system, the dust is almost certainly removed while the exhaust gas passes through the knock-out drum and/or the seal drum. Hence, emission of the dust and other such impurities to the atmosphere, which is problematic from the perspective of environmental pollution control, can be suppressed.

BRIEF DESCRIPTION OF THE DRAWINGS

FIG. 2 is a configuration diagram illustrating a second embodiment relating to the flare system and the method for reducing dust therefrom according to the present invention.

DETAILED DESCRIPTION OF THE INVENTION

Figure 1:
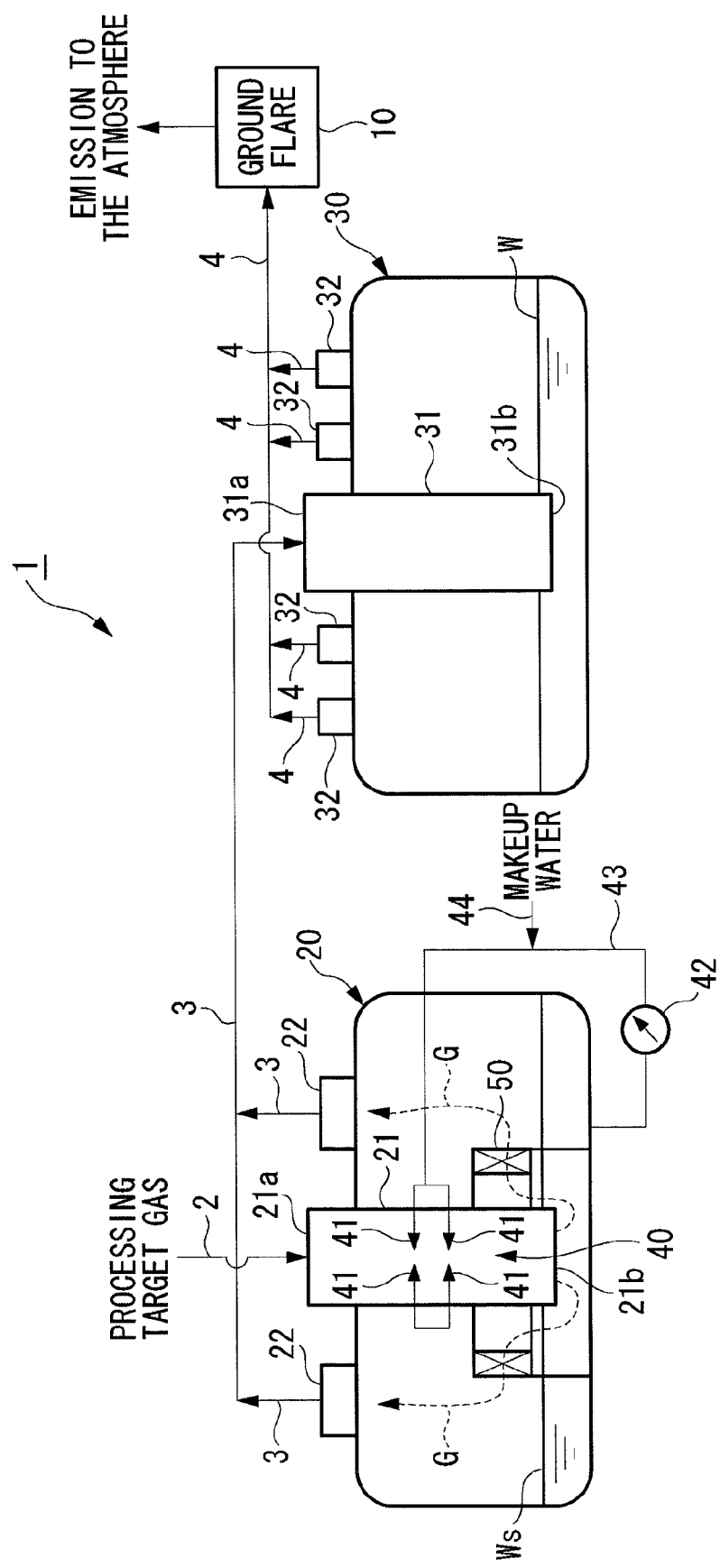
FIG. 1 is a configuration diagram illustrating a first embodiment relating to a flare system and a method for reducing dust therefrom according to the present invention.

Hereinafter, embodiments relating to a flare system and a method for reducing dust therefrom according to the present invention are described with reference to the drawings.

In a first embodiment illustrated in FIG. 1, a ground flare system 1 as an example flare system performs an incineration process on processing target gas (exhaust gas such as flammable gas) generated from various plants for petroleum refining, iron manufacturing, coal gasification, and the like, and emits the processed gas from a funnel (not illustrated) to the atmosphere.

The ground flare system 1 in FIG. 1 includes: a ground flare (incineration unit) 10 that combusts the processing target gas; a knock-out drum 20 that is placed upstream of the ground flare 10 and reduces the flow velocity of the processing target gas introduced thereto; and a seal drum for backfire prevention 30 placed upstream of the ground flare 10.

The ground flare 10 is an incinerator that is installed on the ground and combusts the processing target gas, and the ground flare 10 is coupled to the funnel (not illustrated) that emits combustion exhaust gas generated by the combustion, to the atmosphere.

The knock-out drum 20 is, for example, a horizontal drum, and abruptly expands the flow channel of the processing target gas that has flown through a piping flow channel 2, to thereby decelerate the processing target gas. The knock-out drum 20 thus configured includes a gas introducing pipe 21 that penetrates through a wall member of the drum upper surface in the top-bottom direction.

On the lower end side of the gas introducing pipe 21, an exit opening 21b is formed in the vicinity of the inner bottom surface of the knock-out drum 20.

Accordingly, the processing target gas is decelerated by the knock-out drum 20 while flowing into the space inside of the knock-out drum 20 from the exit opening 21b of the gas introducing pipe 21.

The processing target gas thus decelerated passes through a piping flow channel 3 coupled to one or more exit nozzles 22 provided on the upper surface of the knock-out drum 20, and flows toward the seal drum 30 (to be described later).

The seal drum 30 is arranged between the knock-out drum 20 and the ground flare 10, and is an apparatus that prevents a backfire phenomenon, in which the flame of the processing target gas that is subjected to the incineration process in the ground flare 10 propagates to a generation source of the processing target gas. The seal drum 30 in FIG. 1 is, for example, a horizontal drum having a bottom portion filled with seal water W, whereby the processing target gas supplied to the ground flare 10 passes through the seal water W.

The seal drum 30 includes a gas introducing pipe 31 that penetrates through a wall member of the drum upper surface in the top-bottom direction. On the lower end side of the gas introducing pipe 31, an exit opening 31b is formed in the seal water W in the vicinity of the inner bottom surface of the seal drum 30.

Further, one or more exit nozzles 32 are provided on the drum upper surface of the seal drum 30. A piping flow channel 4 that connects the seal drum 30 to the ground flare 10 is coupled to the exit nozzles 32.

Accordingly, the processing target gas that passes through the seal drum 30 flows in from an upper portion 31a of the gas introducing pipe 31 coupled to the piping flow channel 3, flows into the seal water W from the exit opening 31b, then passes through the space inside of the seal drum 30, and flows into the piping flow channel 4 from the exit nozzles 32. Hence, the seal water W that fills the bottom portion of the seal drum 30 exists in the piping flow channels 2, 3, and 4 that connect the generation source of the processing target gas to the ground flare 10 that performs the incineration process on the processing target gas. Accordingly, even if the flame of the processing target gas that is subjected to the incineration process in the ground flare 10 tries to propagate to the generation source, the backfire is prevented while the processing target gas passes through the seal water W.

In the ground flare system 1 thus configured, according to the first embodiment illustrated in FIG. 1, a water film forming unit 40 is provided inside of the gas introducing pipe 21 that introduces the processing target gas into the knock-out drum 20, and the water film forming unit 40 forms a water film of spray water in a direction that intersects with the flow direction of the processing target gas.

Specifically, the water film forming unit 40 forms the water film in the substantially horizontal direction inside of the gas introducing pipe 21 that causes the processing target gas to flow in the top-bottom direction. Accordingly, the entirety or substantially the entirety of the processing target gas that flows downward through an entrance opening 21a of the gas introducing pipe 21 passes through the horizontal water film that intersects with the gas flow direction.

The water film forming unit 40 includes: a water film forming nozzle 41 that jets the spray water; a circulation pump 42 that supplies the spray water to the water film forming nozzle 41; and a spray water flow channel 43 that connects the water film forming nozzle 41 to the circulation pump 42 and circulates the spray water therebetween. The water film forming unit 40 thus configured causes the spray water jetted by the water film forming nozzle 41 to accumulate in a bottom portion of the knock-out drum 20.

The spray water that accumulates in the bottom portion of the knock-out drum 20 is fed under pressure to the spray water flow channel 43 by an operation of the circulation pump 42, and the spray water guided to the spray water flow channel 43 is supplied again to the water film forming nozzle 41 to be jetted thereby, whereby a circulation flow channel is formed. Accordingly, the water film forming unit 40 enables repetitive use of the spray water.

Further, the spray water used to form the water film is evaporated by contact with the high-temperature processing target gas, and the resultant vapor flows out together with the processing target gas. Accordingly, in order to enable a continuous long-term operation, it is desirable to provide a water supply line 44 that supplies makeup water corresponding to a reduction in the circulating spray water, as a countermeasure against the reduction in the circulating spray water.

The water film forming nozzle 41 used for the water film forming unit 40 may jet the spray water in, for example, a substantially fan-like tabular shape, and the particle size of the jetted spray water may be larger than the particle size of dust contained in the processing target gas. The number of the water film forming nozzles 41 thus configured is determined so as to suit nozzle performance, the inner diameter of the gas introducing pipe 21, and the like. Then, the plurality of water film forming nozzles 41 are placed at substantially equal intervals along the inner circumferential surface of the gas introducing pipe 21 such that each water film forming nozzle 41 jets the spray water in the substantially horizontal direction to form a fan-like shape.

As a result, the fan-like shapes respectively formed by the water film forming nozzles 41 are appropriately overlapped inside of the gas introducing pipe 21 that causes the processing target gas to flow in the top-bottom direction, whereby the horizontal water film is formed so as to be substantially orthogonal to the flow direction of the processing target gas and cover substantially the entire region in a cross section of the gas introducing pipe 21.

According to the ground flare system 1 thus configured, because the water film forming unit 40 is provided inside of the knock-out drum 20, the water film of the spray water that intersects with the flow direction of the processing target gas (top-bottom direction) is formed in the horizontal direction inside of the gas introducing pipe 21 that introduces the processing target gas. Hence, the flow of the processing target gas cannot fail to pass through the water film when passing through the gas introducing pipe 21.

As a result, the apparent specific gravity of the dust contained in the processing target gas is increased by contact with particles of the spray water, so that a fall of the dust under its own weight is promoted. That is, the particles of the spray water come into contact with and are attached to the dust contained in the processing target gas, so that the apparent specific gravity of such dust is increased by the amount corresponding to the attached spray water. Hence, such dust falls under its own weight to be thereby separated from the flow of the processing target gas.

The above-mentioned spray water falls together with the dust to accumulate as circulation water Ws in the bottom portion of the knock-out drum 20. Hence, if the exit opening 21b of the gas introducing pipe 21 is located in the circulation water Ws, the circulation water Ws can be repetitively used as the spray water, and, in addition, the circulation water Ws can provide a function similar to the backfire preventing function that is fulfilled by the seal water in the seal drum 30. This means that the knock-out drum 20 also has the function of the seal drum 30, and hence the knock-out drum 20 and the seal drum 30 may be integrated with each other in some situations.

Further, it is desirable that the water film forming nozzles 41 of the water film forming unit 40 be placed so as to respectively form the water films at a plurality of stages in the flow direction of the processing target gas. In this case, the particle size of the jetted spray water is set to be gradually larger from the water film forming nozzle 41 on the upstream side to the water film forming nozzle 41 on the downstream side.

In this way, in the water film forming unit 40, the particle size of the spray water is set to be smaller on the upstream (upper stage) side close to the entrance opening 21a, whereby the contact area with dust particles having a small particle size is mainly increased, thus achieving an increase in apparent specific gravity. Then, the particle size of the spray water is set to be larger on the downstream (lower stage) side close to the exit opening 21b than that at the upper stage, whereby the apparent specific gravity of the dust that has been increased by the spray water on the upstream side can be further increased. Note that the reason for such an increase in the apparent specific gravity of the dust is that the spray water is attached to the dust and surrounds the same. Accordingly, it is desirable that the particle size of the spray water be set to be larger than the particle size of the dust to be processed.

The ground flare system 1 is further provided with a mist separator 50 inside of the knock-out drum 20, and the processing target gas that has passed through the water film forming unit 40 passes through the mist separator 50. Note that dashed arrows G in FIG. 1 show a main flow of the processing target gas.

The mist separator 50 is made of, for example, a large number of plate materials bent in a corrugated shape or the like, and a complicated flow channel is formed between adjacent plate materials in the mist separator 50. In the configuration example of FIG. 1, the mist separator 50 having a ring-like shape is installed at a position slightly higher than the surface of the circulation water Ws so as to surround the outer circumference of the gas introducing pipe 21.

In this case, the large number of corrugated plate materials forming the mist separator is radially placed in plan view. Accordingly, a large number of corrugated flow channels between adjacent plate materials are also radially formed. Mist such as vapor that tries to pass through the mist separator 50 together with the flow of the processing target gas collides against the corrugated flow channels, whereby moisture can be separated and removed from the flow of the processing target gas. That is, if the mist separator 50 is installed inside of the knock-out drum 20, the mist that tries to flow out together with the processing target gas can be removed, and hence the moisture contained in the gas that is subjected to the incineration process in the ground flare 10 can be reduced. Note that the installation position of the mist separator 50 is not limited to the example illustrated in FIG. 1, and may be, for example, near the exit nozzles 22 in an upper portion inside of the knock-out drum 20.

In the first embodiment described above, the water film forming unit 40 is provided to the gas introducing pipe 21 of the knock-out drum 20. Alternatively, as in a second embodiment illustrated in FIG. 2, a similar water film forming unit 40A may be provided to the seal drum 30.

The water film forming unit 40A has substantially the same configuration as that of the water film forming unit 40 provided to the knock-out drum 20, except that the water film forming unit 40A uses the seal water W in the seal drum 30 also as the spray water. Accordingly, the same elements as those in the water film forming unit 40 in the first embodiment are denoted by the same reference signs, and detailed description thereof is omitted.

With the water film forming unit 40A thus configured being provided, the apparent specific gravity of the dust contained in the processing target gas is increased while the flow of the processing target gas passes through the water film. Hence, a fall of the dust under its own weight is promoted, and the dust contained in the processing target gas is separated from the flow of the processing target gas.

Accordingly, it is possible to implement a dust reducing method for the ground flare system 1, the ground flare system 1 including: the ground flare 10 that combusts the processing target gas; the knock-out drum 20 that is placed upstream of the ground flare 10 and reduces the flow velocity of the processing target gas introduced thereto; the seal drum for backfire prevention 30 placed upstream of the ground flare 10; and the gas introducing pipe 21, 31 that introduces the processing target gas into the knock-out drum 20 and/or the seal drum 30, the method including: forming the water film of the spray water inside of the gas introducing pipe 21, 31; and causing the processing target gas to pass through the water film.

As described above, according to the ground flare system 1 and the method for reducing dust from the ground flare system 1 of the present embodiments, the water film of the spray water is formed inside of the gas introducing pipe 21, 31 that introduces the processing target gas into the knock-out drum 20 and/or the seal drum 30, and the processing target gas is caused to pass through the water film. Accordingly, the apparent specific gravity of the dust contained in the processing target gas is increased, so that a fall of the dust under its own weight is promoted. Hence, the dust contained in the processing target gas can be efficiently separated from the flow of the processing target gas, and the removal rate of the dust contained in the processing target gas can be further enhanced.

As a result, even if dust is contained in the exhaust gas introduced to the ground flare system 1, the dust is almost certainly removed while the exhaust gas passes through the knock-out drum 20 and/or the seal drum 30. Hence, emission of the dust and other such impurities to the atmosphere, which is problematic from the perspective of environmental pollution control, can be suppressed.

Further, the knock-out drum 20 and the seal drum 30 that are conventionally used are applied to the ground flare system 1 and the method for reducing dust from the ground flare system 1 of the present embodiments. Hence, it is not necessary to newly add apparatuses and systems such as drums for the exclusive use of dust removal, and this is advantageous in installation space and costs.

Further, in the embodiments described above, the water film forming unit 40, 40A is provided to any one of the knock-out drum 20 and the seal drum 30. Alternatively, the water film forming units may be respectively provided to both the drums, and the knock-out drum 20 and the seal drum 30 may be integrated with each other.

Note that the present invention is not limited to the ground flare systems of the embodiments described above, and can be changed as appropriate within a range not departing from the gist thereof. For example, the present invention can be applied to general flare systems.

REFERENCE SIGNS LIST 1 ground flare system (flare system)
2, 3, 4 piping flow channel
10 ground flare (incineration unit)
20 knock-out drum
21, 31 gas introducing pipe
30 seal drum
40, 40A water film forming unit
41 water film forming nozzle
42 circulation pump
43 spray water flow channel
44 water supply line
50 mist separator

The invention claimed is:
1. A flare system that performs an incineration process on processing target gas and emits the processed gas to an atmosphere, the flare system comprising:
 an incineration unit that combusts the processing target gas;
 a knock-out drum that is placed upstream of the incineration unit and reduces a flow velocity of the processing target gas introduced thereto;
 a seal drum for backfire prevention placed upstream of the incineration unit;
 a gas introducing pipe that introduces the processing target gas into at least one of the knock-out drum and the seal drum; and
 a water film forming unit that is provided inside the gas introducing pipe and forms a water film of spray water in a direction that intersects with a flow direction of the processing target gas,
 wherein the water film formation unit comprises a plurality of nozzles placed along an inner circumferential surface of the gas introducing pipe so as to form the water film at a plurality of stages in the flow direction of the processing target gas,
 wherein the plurality of nozzles include an upstream side nozzle and a downstream side nozzle relative to the flow direction of the processing target gas, and wherein the plurality of nozzles are disposed so that particle size of the jetted spray water is gradually larger from the upstream side nozzle to the downstream side nozzle.

2. The flare system according to claim 1, further comprising, inside at least one of the knock-out drum and the seal drum, a mist separator through which the processing target gas that has passed through the water film forming unit passes.

3. The flare system according to claim 1, wherein
the water film forming unit includes:
- a circulation pump that supplies the spray water to the nozzles; and
- a spray water flow channel that connects the nozzles to the circulation pump and circulates the spray water therebetween.

4. The flare system according to claim 1, wherein the plurality of nozzles are placed at substantially equal intervals along the inner circumferential surface of the gas introducing pipe such that each of the plurality of nozzles jets water in a substantially horizontal direction in a fan-like shape.

5. The flare system according to claim 4, wherein the plurality of nozzles are positioned so that the fan-like shapes overlap inside the gas introducing pipe to form a horizontal water film that is substantially orthogonal to the flow direction of the processing target gas.

6. A method for reducing dust from a flare system that performs an incineration process on processing target gas and emits the processed gas to an atmosphere,
the flare system including:
- an incineration unit that combusts the processing target gas;
- a knock-out drum that is placed upstream of the incineration unit and reduces a flow velocity of the processing target gas introduced thereto;
- a seal drum for backfire prevention placed upstream of the incineration unit;
- a gas introducing pipe that introduces the processing target gas into at least one of the knock-out drum and the seal drum; and
- a water film forming unit that is provided inside the gas introducing pipe to form a water film of spray water in a direction that intersects with a flow direction of the processing target gas, wherein the water film formation unit comprises a plurality of nozzles placed along an inner circumferential surface of the gas introducing pipe, the plurality of nozzles including an upstream side nozzle and a downstream side nozzle, the method comprising:
- placing the plurality of nozzles such that particle size of the jetted spray water is gradually larger from the upstream side nozzle to the downstream side nozzle relative to the flow direction of the processing target gas;
- forming a water film of spray water at a plurality of stages in the flow direction of the processing target gas inside the gas introducing pipe by jetting the spray water from the nozzles; and
- causing the processing target gas to pass through the water film.

7. The method for reducing dust from a flare system according to claim 6, further comprising causing the processing target gas that has passed through the water film to pass through a mist separator provided inside at least one of the knock-out drum and the seal drum.

8. The method for reducing dust from a flare system according to claim 6, further comprising:
- connecting the nozzles that jet the spray water, to a circulation pump that supplies the spray water to the nozzles; and
- circulating the spray water between the nozzles and the circulation pump.

9. The method for reducing dust from a flare system according to claim 6, wherein the plurality of nozzles are placed at substantially equal intervals along the inner circumferential surface of the gas introducing pipe such that each of the plurality of nozzles jets water in a substantially horizontal direction in a fan-like shape.

10. The method for reducing dust from a flare system according to claim 9, wherein the plurality of nozzles are positioned so that the fan-like shapes overlap inside the gas introducing pipe to form a horizontal water film that is substantially orthogonal to the flow direction of the processing target gas.

* * * * *